United States Patent Office 3,616,546
Patented Nov. 2, 1971

3,616,546
APPARATUS FOR PACKAGING GROUPS OF ARTICLES IN A TUBULAR SLEEVE
John George Selby Billingsley, Newark, and Jack Edgar Colsen, Hockessin, Del., Edward Stanley Pierce, Sinking Springs, Pa., Harold Eugene Ramsey, Wilmington, Del., and Paul Glenn Stephan, Landenberg, Pa., assignors to E. I. du Pont de Nemours and Company, Wilmington, Del.
Application Nov. 12, 1968, Ser. No. 778,360, now Patent No. 3,513,620, which is a continuation of application Ser. No. 483,945, Aug. 31, 1965. Divided and this application Sept. 5, 1969, Ser. No. 855,675
Int. Cl. B65b 1/02
U.S. Cl. 34—217
6 Claims

ABSTRACT OF THE DISCLOSURE

A high speed apparatus and process for continuously automatically packaging groups of articles in a tubular sleeve member, involving continuously conveying a plurality of articles from a first position along a given path to a second position, forming said articles into a series of spaced groups, supplying shrinkable film continuously into operative association with said articles, forming the film into an elongated surrounding envelope around said articles, sealing said film to form a unitary sleeve assembly surrounding said articles, severing said sleeve assembly to form individual groups of articles each enclosed by a tubular sleeve member having open end portions, first shrinking the end portions only of the sleeve member to form at least partial end closures therefrom and then shrinking the entire sleeve member into secure engagement with said articles contained in each sleeve member.

---

This application is a division of our copending application Ser. No. 778,360, filed Nov. 12, 1968, now U.S. Pat. 3,513,620 which application is a streamlined continuation application of our application Ser. No. 483,945, filed Aug. 31, 1965, now abandoned.

This invention relates generally to an improved high speed apparatus and method for continuously and automatically packaging groups of articles to form packaged units of increased suitability for efficient handling, transport, and storage. More specifically the invention involves a new and improved high speed apparatus and method arrangement for packaging cylindrical articles such as cans to form six-can packages using continuously supplied flexible heat-sealable and heat-shrinkable film or sheet preferably of transparent material, in combination with continuously supplied suitable can spacer units each preferably provided with a manually engageable handle portion for carrying the completed package. The new and improved arrangement is automatic and continuous, receives a continuous stream of regular articles of substantially uniform size, separates the articles into spaced groups, moves said groups of articles continuously from a first position along a given line of movement to a second position, forms continuously supplied flexible film into an elongated surrounding envelope around said groups as the groups move from said first position toward said second position, continuously seals film edges to form a unitary sleeve assembly surrounding said groups as they move toward said second position, continuously severs the sleeve assembly between said groups as they move toward said second position to form individual groups of articles each enclosed by a tubular sleeve member having open end portions, shrinks the open end portions of each sleeve member into engagement with the articles at the ends of the contained group of articles, and then further shrinks each entire sleeve member into close engagement with all of the articles in its contained group.

According to past art, especially that are relating to the formation of packages, such as the six-can packages, the previously known packaging arrangements, which have involved bringing groups of articles and individual pre-formed package units into operative association have not been continuous, but rather intermittent in the operation of at least a number of the significant packaging steps and apparatus components. This has prevented the attainment of high packaging speeds and has resulted in fairly complex indexing mechanisms or drives. In the package resulting from the arrangement of this invention, the articles, or cans, themselves are not only supported and contained thereby, but actually form an integral and necessary part of the package providing structural unity and stability to the otherwise unrelated sleeve member and article spacer unit. The packed articles are a necessary component of the package so that the placing and securing of the articles into proper position with respect to each other and the package components must be carried out substantially concurrently to effect formation of the package. The conventional approach of separately forming package units and separately forming groups of articles and then combining formed groups with more or less completely formed package units in a later stage or step cannot be followed in making the package according to this invention, and no effective, high speed approach appears to be known to the art for making such packages.

It is an object of this invention to provide a new improved arrangement of steps and of means to accomplish continuous automatic, more rapid and effective formation of grouped article packages.

It is another object of the invention to provide new and improved component means and component steps for contributing to the function of the overall combination or arrangement.

It is another object of the invention to provide such an arrangement of means, and arrangement of process steps which is effective, reliable, flexible in operation, yet reasonably economical to fabricate, operate, maintain and repair.

Other objects and advantages will appear from a consideration of the following specification, the claims, and the accompanying drawings in which:

Figure 1:
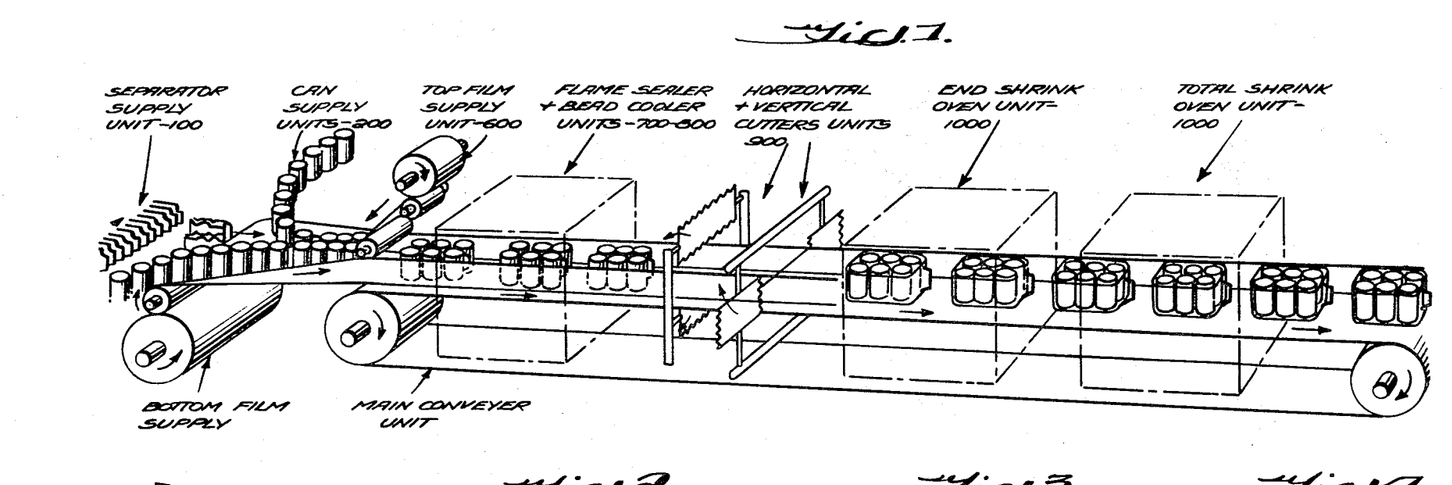
FIG. 1 is a diagrammatic, somewhat schematic perspective view illustrating the general features and relationship of the components of an arrangement embodying principles of the invention.

The overall action of the method and apparatus embodying principles of this invention is illustrated very generally in FIG. 1 in which a continuous stream of articles C are received and arranged in spaced groups by can supply units 200, which groups are combined with article spacer or separator elements continuously supplied from separator supply unit 100, and moved in the direction indicated along a given path of movement by a main conveyor unit 400. Concurrently, flexible shrinkable film, BF or $F_1$, is continuously supplied from a bottom film supply unit 300 and a similar film, TF or $F_2$, is continuously supplied from a top film supply unit 600 and formed into an elongated surrounding envelope around the groups of articles as the groups move along the path of movement established by the main conveyor unit 400. The edges of the film are continuously sealed by the flame sealer and bead, or seam, cooler units, 700 and 800, to form a unitary sleeve assembly surrounding the groups as they are moved by the main conveyor unit. The unitary sleeve assembly is severed between the moving groups by the action of the horizontal and vertical cutter units 900 to form individual groups of articles engaging a separator element and enclosed by a tubular sleeve member having open end portions. The individual groups of articles each enclosed by a tubular sleeve member are treated by an end shrink oven unit 1000 to shrink the open end portions of each sleeve member into engagement with the articles at the ends of each contained group of articles and then the groups of articles each surrounded by a sleeve member are further treated in total shrink oven unit 1100 to shrink each entire sleeve member into close engagement with all of the articles in its contained group.

Figure 2:
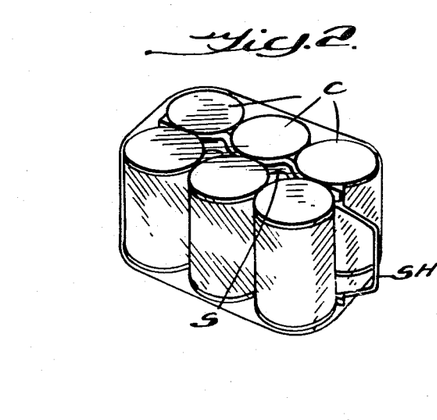
FIG. 2 is a perspective view of the package of articles formed by the preferred form of packaging arrangement of the invention.

A completed package prepared according to a preferred embodiment of this invention is shown in FIG. 2, in which the articles or cans C can be seen surrounded by the sleeve member with its open end shrunk into engagement with the articles at the ends of the package. The article spacer or separator unit S with the manually engageable carrying handle SH is also visible in this figure.

Figure 3:
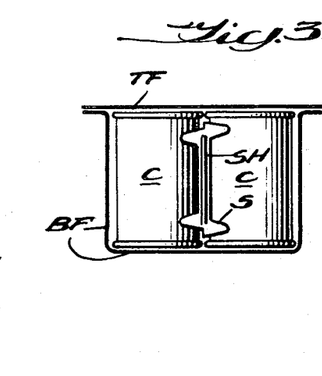
FIG. 3 is a transverse cross-sectional view of the partially completed package structure prior to the seam sealing, cutting and shrinking treatments, illustrating the arrangement of the film components which form the package.

FIG. 3 shows an end view of a group of articles surrounded by the elongated envelop of film before the film is sealed to form the unitary sleeve assembly.

Figure 4:
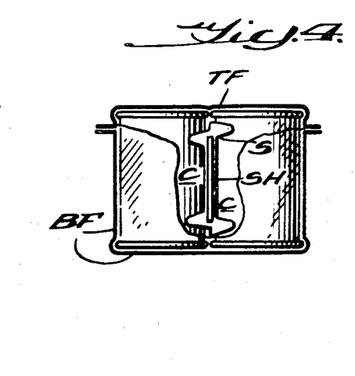
FIG. 4 is a view of the structure shown in FIG. 3 after the seam sealing, cutting, and shrinking treatments which complete the formation of the package.

FIG. 4 is a view similar to FIG. 3 showing the group of articles surrounded by the severed sleeve member after it has been shrunk into engagement with the articles contained therein.

Figure 5A:
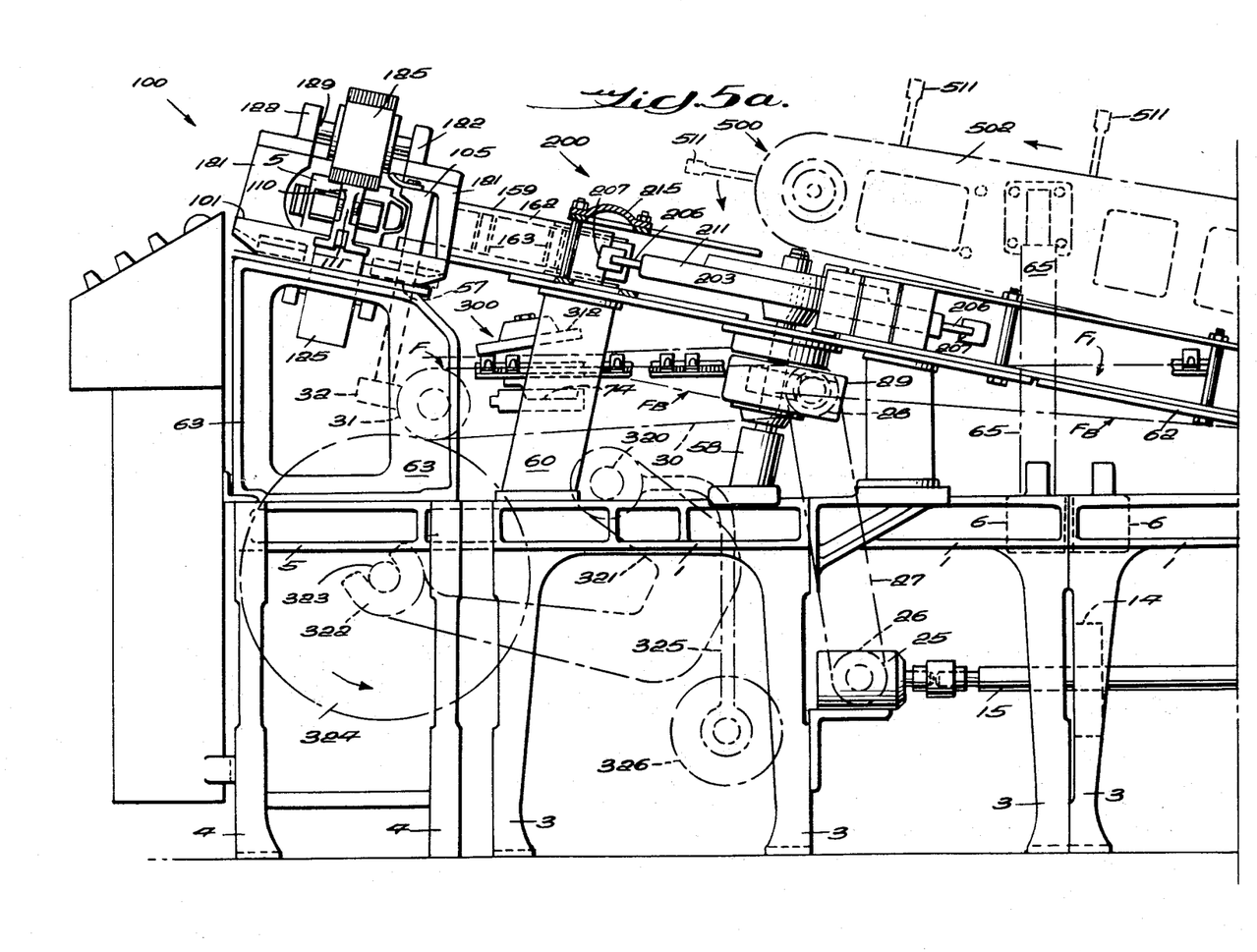
FIGS. 5a, 5b, 5c, 5d, and 5e form a composite side elevational view of a packaging apparatus embodying principles of the invention.
Figure 5B:
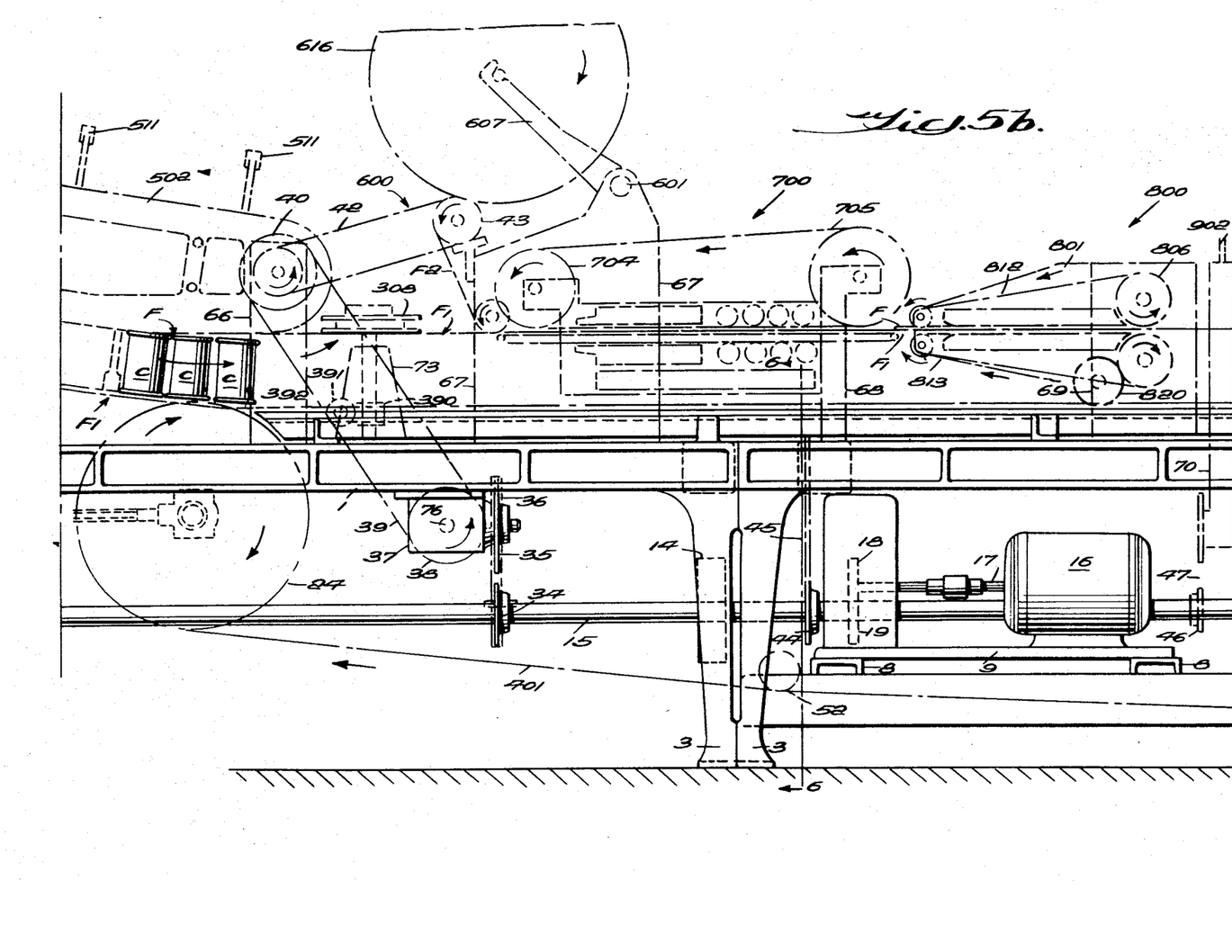
Figure 5C:
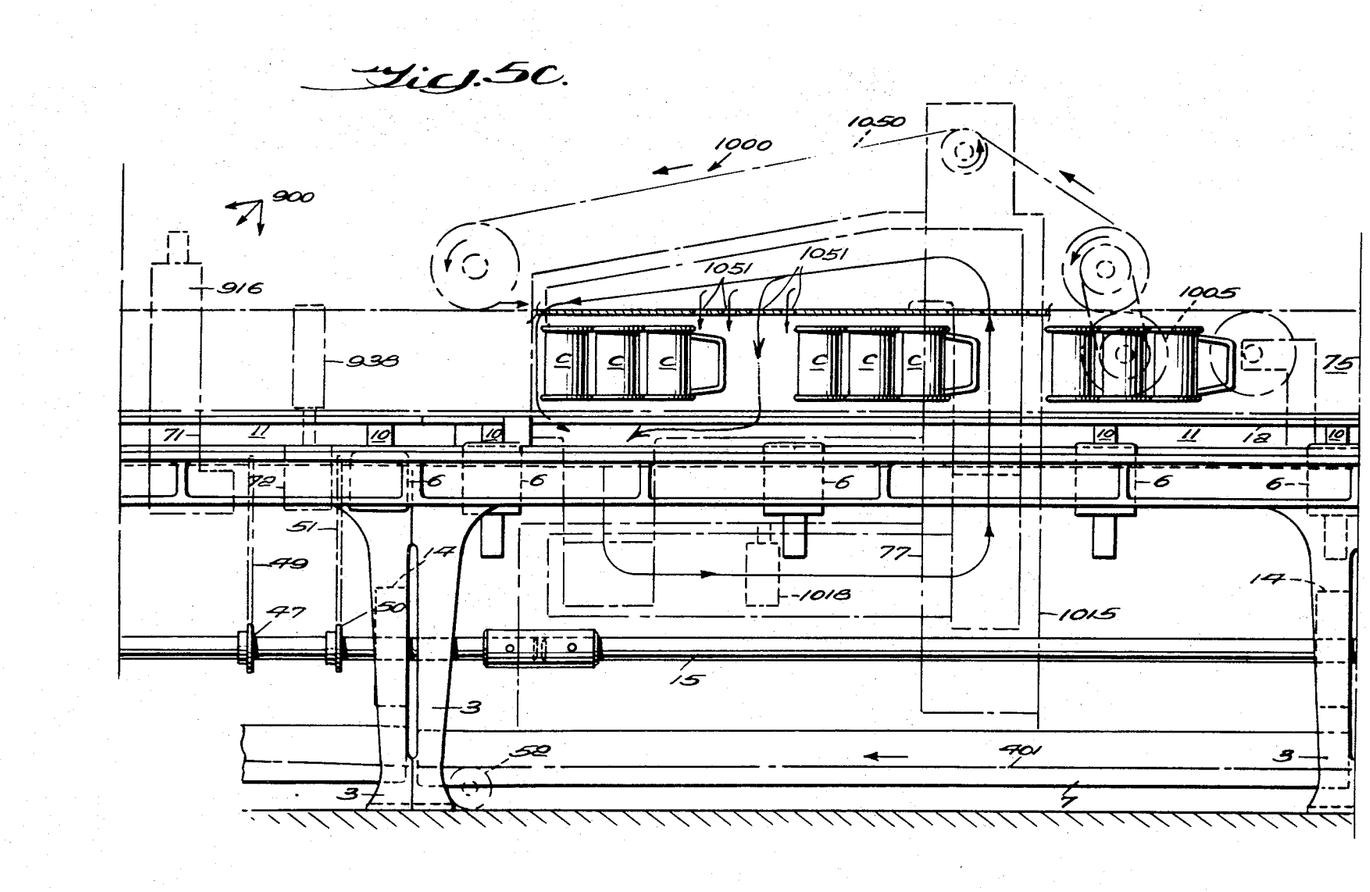
Figure 5D:
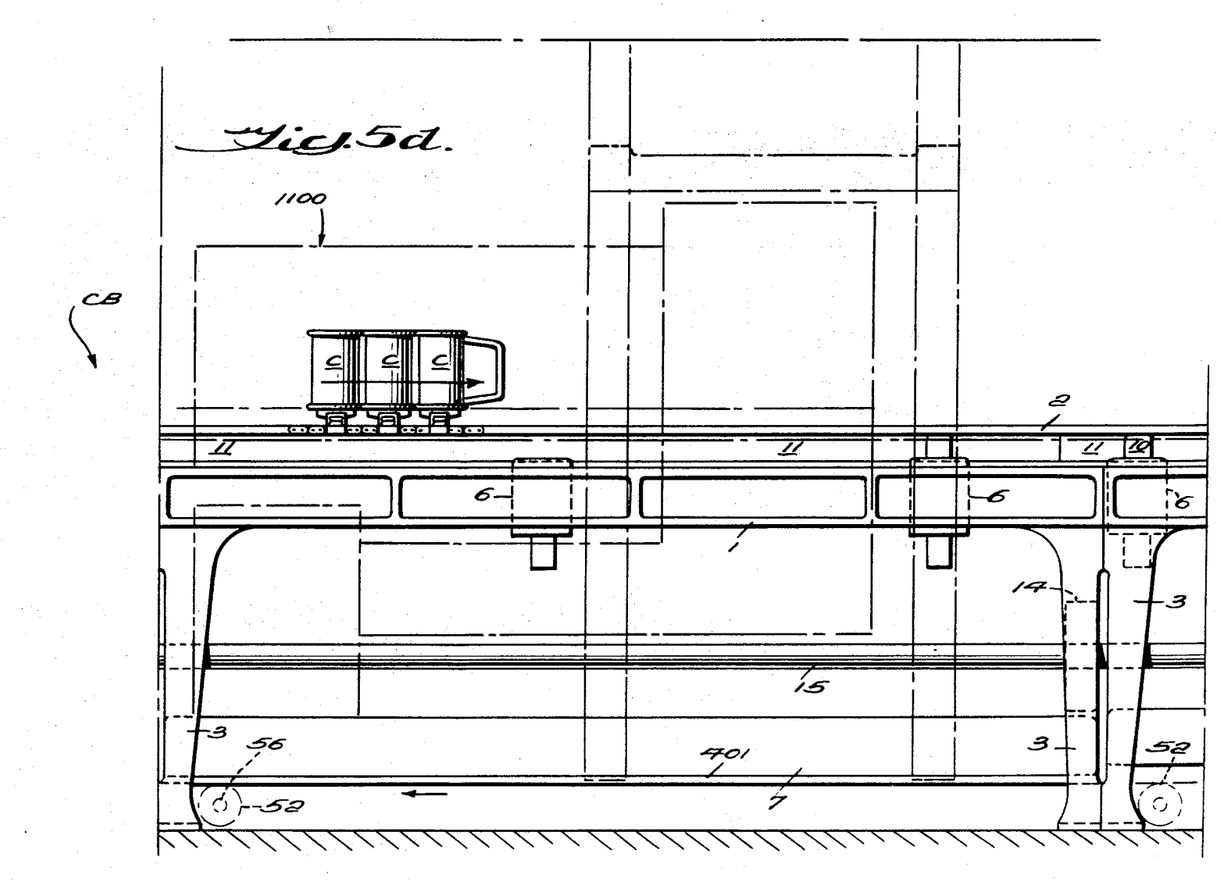
Figures 5E, 6:
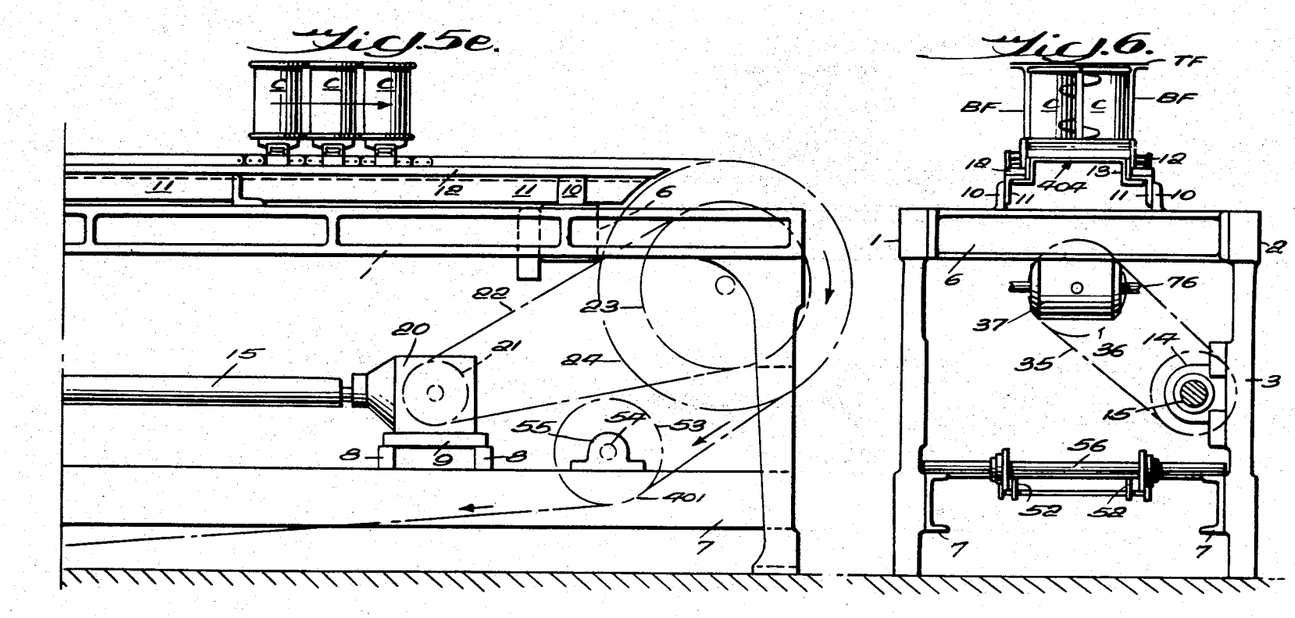
FIG. 6 is a transverse cross-sectional view of the apparatus of FIG. 5 taken at line 6—6 of FIG. 5b.

As shown generally in FIGS. 5a, 5b, 5c, 5d, 5e and 6, the apparatus of this invention comprises an elongated supporting frame structure formed from individual units each comprising vertical leg elements 3 interconnected at their upper extremities by longitudinally extending horizontal elements 1 and transversely extending horizontal elements 6. Certain of the supporting frame units are provided with additional longitudinally extending horizontal elements 7 interconnected with the leg elements 3 near their lower extremities. The transversely extending elements 6 are provided with opposing upwardly projecting bracket elements 10 to which are secured, by suitable means, elongated longitudinally extending parallel support elements 11. Mounted on support elements 11 and secured thereto by suitable means are parallel horizontal longitudinally extending track or guide elements 12 which engage, support and guide two spaced endless main conveyor chain assemblies 401, shown in an enlarged view in FIGS, 13, 14, and 15. The main conveyor chain assemblies 401 carry between them transversely extending article conveyor racks 404. At each end of the parallel track elements 11 and in operative alignment therewith are a pair of spaced sprocket wheels 24 rotatably mounted in the supporting frame structure. The two endless conveyor chain assemblies 401 extend along the horizontal track elements 12, around the sprocket wheels 24, and along the lower portion of the supporting frame structure where they are engaged and supported by idler wheels 52. The spaced sprocket wheels 24 at the right hand end of the apparatus as viewed in FIG. 5e are driven in the direction indicated by the arrows in FIG. 5e by means of another sprocket wheel 23 rigidly connected to the shaft on which sprocket wheels 24 are rigidly mounted. Sprocket wheel 23 engages an endless drive chain 21 driven by sprocket wheel 21 which is driven from a longitudinally extending horizontal rotary drive shaft 15 through a direction changing gear box 20 mounted on transversely extending platform comprising elements 8 and 9 mounted on the lower longitudinal element 7 of the supporting frame structure. As viewed in FIGS. 5a, 5b, 5c, 5d, and 5e, the upper portions of the endless conveyor chain assemblies, supported and guided by track element 12, and carrying article conveyor racks 404, move from left to right. Rotary drive shaft 15 is rotatably supported by bearing units 14 secured by suitable means to vertical leg elements 3, as best seen in FIG. 6. The drive shaft 15 itself is driven by a suitable drive motor 16 (FIG. 5b), mounted on a transversely extending platform comprising elements 8 and 9 mounted on the lower longitudinal elements 7 of the supporting frame structure, through motor shaft 17, sprocket 19 rigidly carried by shaft 17, and drive chain 18 connecting sprocket 19 with a sprocket (not shown) rigidly attached to shaft 15. Shaft 15 supplies driving power to various component mechanisms mounted along the supporting framework, either directly by sprocket and chain drive arrangements, or indirectly by sprockets rotated by engagement with the conveyor chain assemblies 401 so that the actions of the components are properly synchronized for continuous automatic operation.

Referring to FIGS. 5a, 5b, 5c, 5d, and 5e, starting with FIG. 5a, a laterally widened portion of the supporting frame structure comprising leg elements 4 and interconnected horizontal elements 5, supports a power control panel CP for the apparatus, and also supports a separator or spacer unit feed means 100 by means of support brackets 63. An article feed and group forming means 200 is supported on the frame structure by means of bracket 60 and plate 61. A bottom film feeding and initial package forming means 300 comprises a pair of swingable arms 321 pivotally mounted on shaft 320 carried by the supporting frame structure for holding a roll of film 324 in operative engagement with a rotatable friction drive roll 31 also mounted on the frame structure. The swingable arms are provided with a counterweight assembly comprising arm 325 and counterweight 326 for urging the film roll 324 into constant driving engagement with the drive roll 31. The bottom film feeding and initial package forming means 300 further comprises a horizontally and longitudinally disposed film edge gripping and feeding mechanism extending generally between element 312 and element 308 as seen in FIGS. 5a and 5b and supported on the frame structure by brackets 65, 66, 73, and 75.

An article or can group transfer means 500, for transferring or moving groups of articles from the article feed and group forming means 200 into engagement with the bottom film and the article conveyor racks 404 of the conveyor chain assembly, is mounted on the supporting framework by brackets 65 and 66.

A top film feeding means 600 is mounted on bracket 67 carried by the supporting frame structure and cooperates with a film seam sealing means 700 carried by brackets or support elements 67 and 68. A seam cooling and clamping means 800 is mounted on support elements or brackets 69 which are secured to the supporting frame structure. A sleeve severing means 900 is carried on the supporting frame structure by means of brackets 70, 71, and 72. The next component positioned along the elongated frame structure and the main conveyor path of movement is the package end shrinking means 1000, which is adjacent the total package shrinking means 1100, which carried out the final step to complete package formation.

With regard to the supply of driving power to the various compoent means, a shaft 33 of the separator unit feed means is provided with a driven gear 32 at its lower end which meshes with another gear carried by transverse shaft 58 on which the friction drive roll 31 for film roll 324 is mounted. Shaft 58 and thed rive roll 31 are driven by a toothed belt 30 driven by a sprocket wheel 28 carried by a transverse shaft 29 which is driven by a chain 27 connecting a sprocket wheel or shaft 29 with a sprocket wheel 26. Sprocket wheel 26 is driven from shaft 15 through a direction changing gear box 25 mounted on the supporting frame structure. Shatf 29 also drives gears fixed to shafts 201 of the article feed and group forming means 200. As shown in FIG. 5b, shaft 15 carries a sprocket wheel 36 on gear box 37 by means of drive chain 35. Sprocket 38 of gear box 37 drives sprocket 391 of the film gripping and feeding mechanis of bottom film supply means 300, and also drives sprocket 40 of the article group transfer means 500. In addition, sprocket 38 drives sprocket 43 of the top film feeding means through chain 42 and sprocket 41 rigidly connected to sprocket 40. A driving connection to the seam sealing means 700 is provided by means of sprocket 44 on shaft 15 and drive chain 45. Rotary driving power is provided to seam cooling and clamping means 800 by means of a sprocket wheel 820 engaged with the main conveyor chain assemblies 401. The sleeve severing means 900, which comprises the horizontal cutter units, vertical cutter units, and their associated clamping mechanisms, receives driving power by means of sprocket wheels 46, 48, and 50 mounted on shaft 15 and their associated chains 47, 49, and 51. A driving connection to the package end shrinking means 1000 is provided by sprocket wheel 1005 which engages the main conveyor chain assembly 401.

Figure 15:
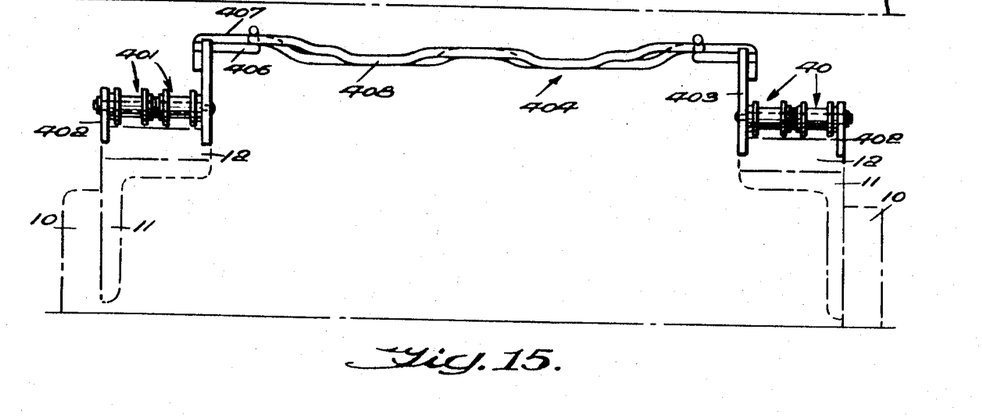
FIG. 15 is an end view of the conveyor assembly shown in FIG. 13.

The overall arrangement of the film and article group main conveyor means 400 is shown generally in FIGS. 5a, 5b, 5c, 5d, 5e, 6, and has been covered generally in the preceding discussion. A more detailed showing of this conveyor means appears in FIGS. 13, 14, and 15. The horizontal, longitudinally extending track elements 12 are provided at each side of their upper surface with cut out portions which form longitudinally extending grooves as best seen in FIG. 15. Each track element 12 carries on its upper surface a double chain assembly 401. Upright side plates 402 and 403 are secured to chain assembly 401 at spaced positions by means of transversely extending pins 405 and conventional snap ring elements. Side plates 402 engage the outer grooves in track elements 12 and side plates 403, which have a greater vertical height, engage the inner grooves in track elements 12 to maintain proper lateral alignment of the chain assembly. Each of the inner side plates 403 are provided at the upper edge thereof with cut out portions which receive and engage end portions of the article conveyor rack elements 404 to support the rack elements 404 between the side plates 403. The rack elements 404 are formed of small diameter flexible resilient rod or wire stock formed in the configuration shown in FIGS. 13, 14, and 15 to support and convey the groups of articles on the bottom film along the conveyor means path of movement. The diameter is selected and the rack elements are designed so that adequate support is provided for the articles conveyed and so that adequate air flow is permitted around the articles and rack elements and between them during the heat shrinking operation so that substantially all of the film engaged between the rack elements and the articles is sufficiently heated to give the desired reasonably uniform and adequate shrinkage. The ends of the rack elements 404 are constructed so that they may be elastically deformed and easily snap-fit in the cut out portions in the upper edges of side plates 403, and easily removed therefrom by similar manipulation. Obviously the rack elements 404 may be replaced with different size and shape elements to enable suitable handling of various types of articles. The main conveyor assembly operates at a predetermined speed to continuously convey not only the articles but also the film which surrounds the articles, toward the outlet end of the apparatus where the completed packages are either removed or engaged by another conveyor for further handling. If desired, the main conveyor means 400 could be terminated at a position between the two shrinking units, or at a position between the severing means 900 and the first shrinking unit 1000 and the articles moved beyond this position by an independent continuously running conveyor of a similar type. Such an arragement would insure that, upon shut-down of the main apparatus and main conveyor due to jam or casualty or other reason, articles already beyond the termination position would be carried automatically safely through the shrinking units by the continuously running independent conveyor without incurring damage due to being stopped in the shrinking units which are preferably of the heat shrinking type.

The package end shrink means 1000 and the total package shrink means 1100 are shown in greater detail in FIGS. 5a–5e and 7–15.

Figure 7:
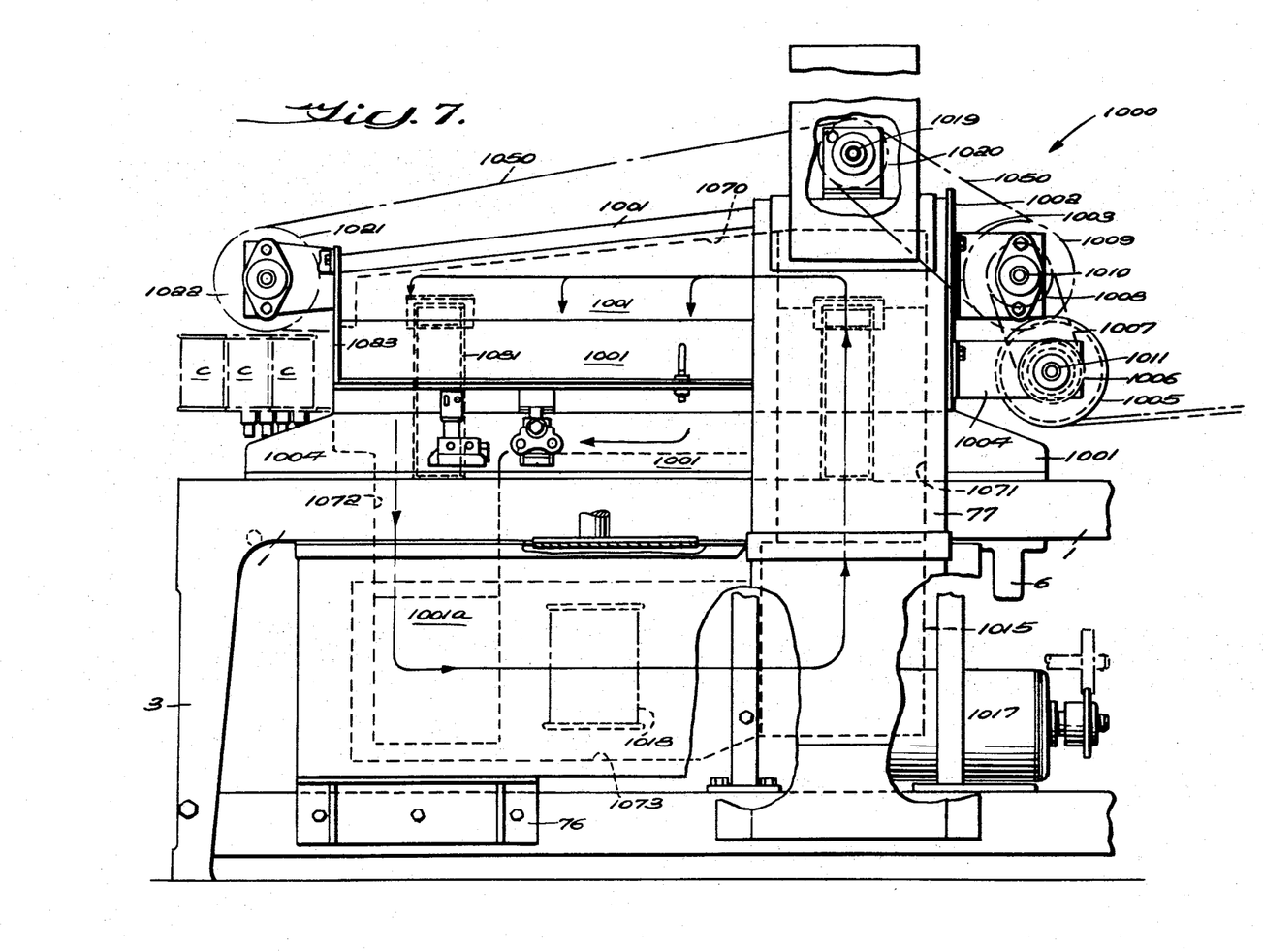
FIG. 7 is an enlarged partial side elevational view of the package end shrinking mechanism of the package forming apparatus embodying principles of this invention.
Figure 8:
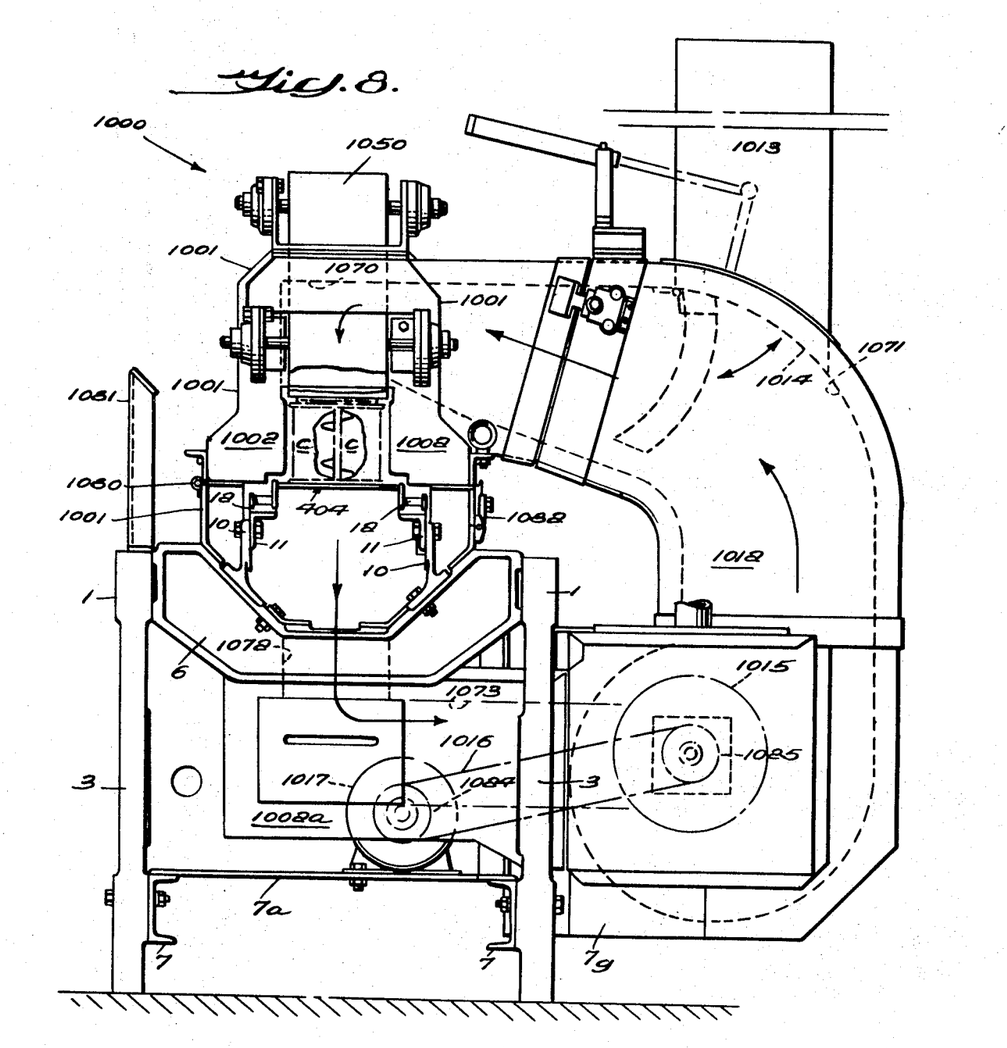
FIG. 8 is an enlarged partial view of the right hand end of the mechanism shown in FIG. 7.
Figures 9, 10:
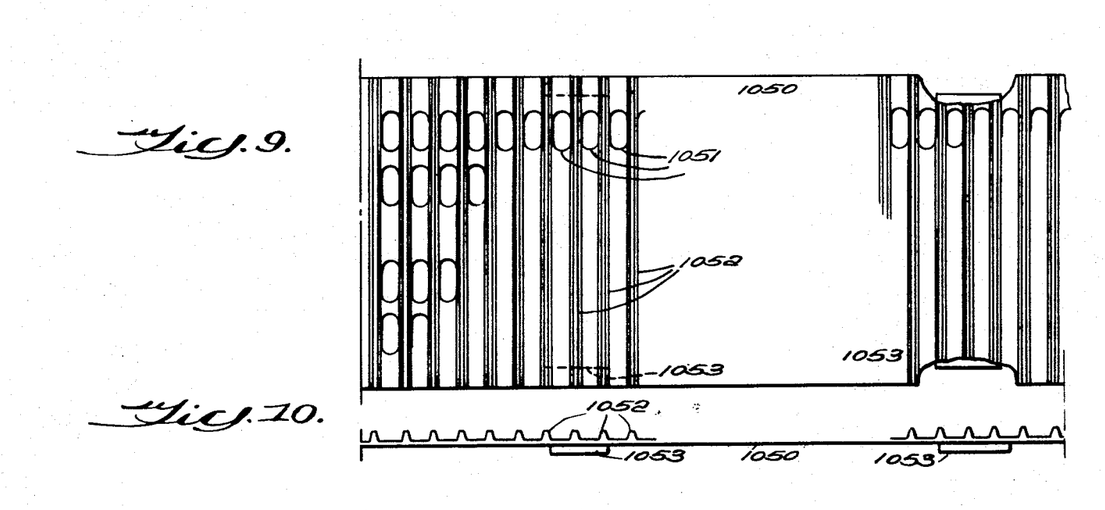
FIG. 9 is an enlarged partial plan view of a portion of the heat shielding endless belt member of the package end shrinking mechanism of FIG. 7.
FIG. 10 is an enlarged partial view of the edge of the portion of the belt member shown in FIG. 9.
Figure 11:
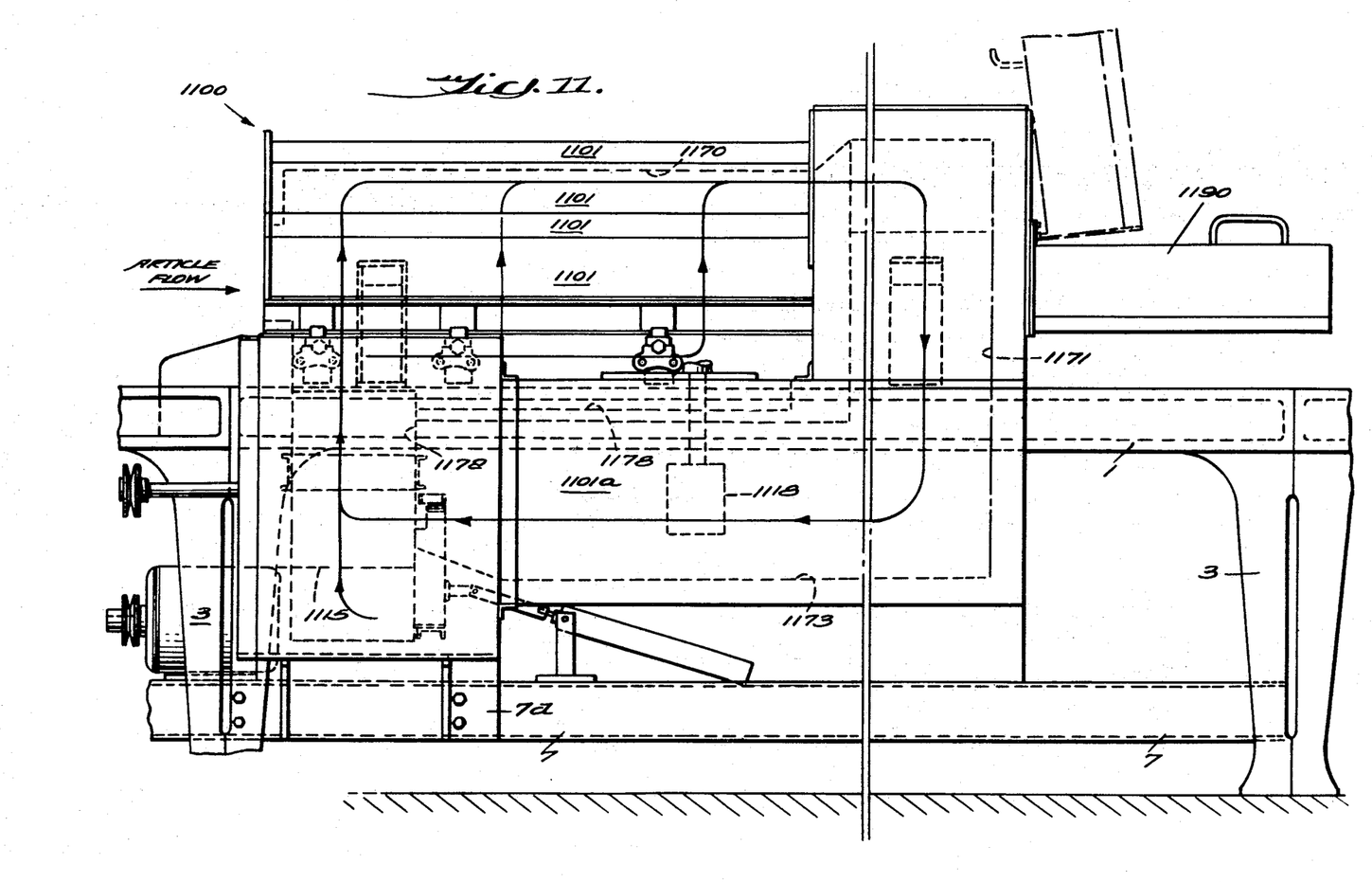
FIG. 11 is an enlarged partial side elevational view of the total package shrinking mechanism of the apparatus of this invention.
Figure 12:
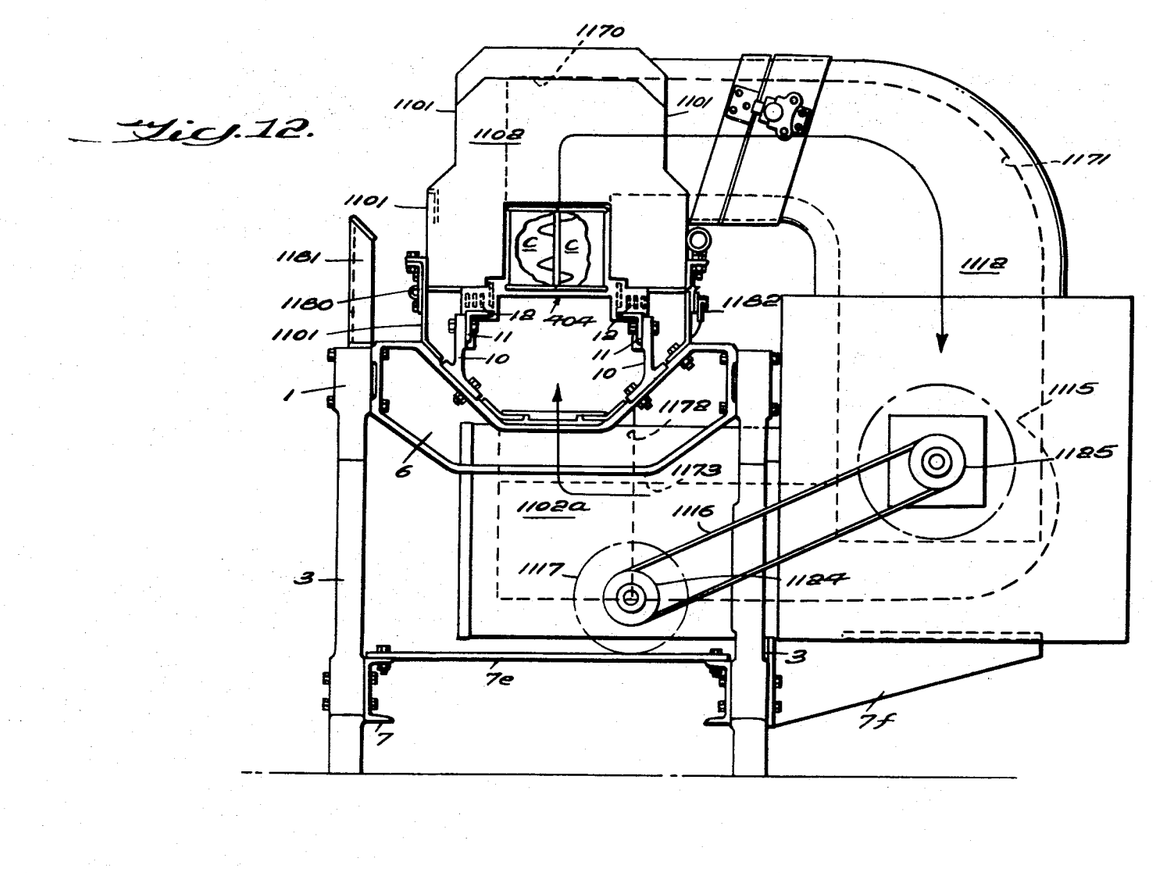
FIG. 12 is an enlarged partial view of the right hand end of the mechanism shown in FIG. 11.
Figure 13:
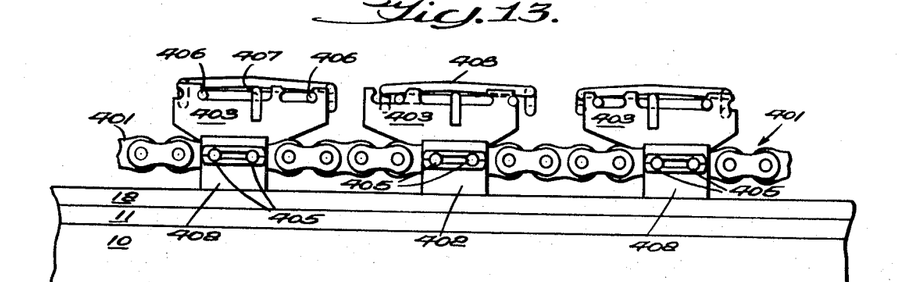
FIG. 13 is an enlarged partial side elevational view of the endless chain conveyor assembly of the apparatus embodying principles of this invention.
Figure 14:
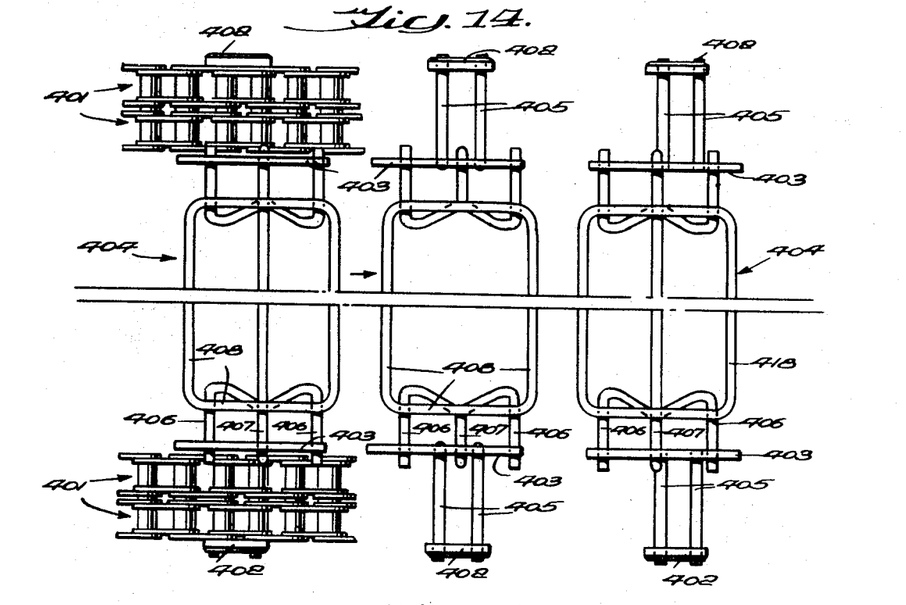
FIG. 14 is an enlarged partial side elevational view of the endless chain conveyor assembly of the apparatus embodying principles of this invention.

The tubular sleeve members and enclosed articles are moved continuously from the severing means 900 to the package end shrink means 1000 which is shown in detail in FIGS. 7 and 8. Package end shrink means 1000 comprises an air heating and circulating system with flow generally indicated by the arrows in FIGS. 7 and 8, mounted on transverse support brackets 6 and lower support members 7 and 7a carried by the main supporting frame structure. This system comprises a casing structure with side elements 1001 and end elements 1002 having openings therein for passage of the packages on the main conveyor means. The casing structure forms an elongated chamber 1070 extending above the line of movement of packages through the end shrink means. The bottom of chamber 1070 is formed by a moving endless belt 1050 which is shown in detail in FIGS. 9 and 10 and which is provided with spaced patterns of holes 1051 therethrough as shown. The spacing between the patterns of holes in the belt 1050 are such that the patterns of holes are aligned only with the spaces between the packages of articles on the main conveyor as they pass beneath chamber 1070. Endless belt is carried by idler rollers 1021 and 1020, and a drive roller 1009 mounted on the casing structure. Roller 1009 is driven by means of sprocket wheel 1008, drive chain 1007, and a sprocket wheel 1005 which engages and is driven by the main conveyor chain assembly 401. Hot air is supplied to chamber 1070 through conduit 1071 from a blower 1015. The hot air supplied to chamber 1070 is directed downwardly through the holes 1051 in the endless belt 1050 to pass between the groups of articles surrounded by the tubular sleeve of film. Since the remainder of the package comprising the film sleeve and contained articles is shielded from the hot air by the unperforated portions of belt 1050, only the open end portions of the film sleeve are subjected to the hot air. This causes the open ends of the film sleeve to shrink sufficiently into engagement with the articles at the ends of the package to insure proper retention of the contained articles in the package. The hot air passing downwardly between the packages and through the main conveyor assembly is collected in a chamber 1072 and conducted by passageway 1073 to the inlet of blower 1015 driven by motor 1017 as shown. A suitable gas burner assembly 1018 of conventional design is provided in passageway 1073 to heat the air to the required temperature to accomplish the desired shrinking of the open end portions of each film sleeve. A vertical stack 1013 is connected to conduit 1071. A pivoted door or damper 1014 is provided to normally close off stack 1013 but actuates upon stoppage of the conveyor to vent the hot air outside the casing structure to prevent excessive heating of packages within the casing structure. The main conveyor means continuously moves the packages from the package end shrink means 1000 to the total package shrink means 1100 which is shown in detail in FIGS. 11 and 12. The total package shrink means 1100 comprises an air heating and circulating system with flow generally indicated by the arrows in FIGS. 11 and 12 and is mounted on transverse support bracket 6 and lower support members 7 and 7e carried by the main supporting frame structure. This system comprises a casing structure with side elements 1101 and end elements 1102 having openings therein for passage of the packages on the moving conveyor means. The casing structure forms an elongated chamber 1178 extending below the line of movement of the packages through the total shrink means. Hot air is supplied to chamber 1178 through conduit 1172 from a blower 1115 driven by motor 1117 as shown. The hot air supplied to chamber 1178 passes upwardly through the main conveyor assembly and around the packages on the conveyor assembly where it is collected in a chamber 1170 above the packages and returned through passageways 1171 and 1173 to the blower 1115. A suitable burner assembly 1118 of suitable design is provided in passageway 1173 to heat the air to the required temperature to accomplish the desired shrinking of each of the entire film sleeves into engagement with all of the articles carried therein to complete package formations. From the total package shrink means the completed packages are continuously moved to the end thereof for unloading or engagement by another conveyor for movement to further desired handling or treatment.

It is believed that the construction and operation of the various component means of the apparatus, as well as the constructions and operations of the overall apparatus combination are clear from the foregoing descriptions.

It is believed further, that it is apparent from this description and accompanying discussions that applicants have provided a new and improved apparatus and method for the high speed efficient forming of packages in accordance with the objects of the invention.

Although preferred embodiments have been described in detail in accordance with the Patent Statute, many variations and modifications within the spirit of the invention will occur to those skilled in the art, and all such are considered to fall within the scope of the following claims.

We claim:

1. An apparatus for continuously packaging a plurality of articles in a heat-shrinkable film wherein spaced individual groups of said articles are each surrounded by a tubular sleeve member having open end portions which extend beyond the ends of said individual groups of articles, the improvement comprising:
a first shrinking unit for initially shrinking said open end portions of each said sleeve member into engagement with the articles at said ends of each said individual groups of articles to retain said articles in said sleeve member, a second shrinking unit for finally shrinking each entire sleeve member into engagement with all of the articles in its group, said first shrinking unit comprising structure defining a heat shrinking zone, means for moving said individual groups of articles continuously along a given path of movement and through said first and said second shrinking units, means for producing a moving stream of heated gas and conducting said stream into said zone, and heat shielding means in said zone and constructed and arranged to direct said stream of heated gas in said zone preferentially upon the open end portions of said tubular sleeve member, wherein said heat shielding means includes an endless belt having spaced parts adapted to move in heat shielding and timed relationship to said individual groups of articles.

2. An apparatus for continuously packaging a plurality of articles in a heat-shrinkable film wherein spaced individual groups of said articles are each surrounded by a tubular sleeve member having open end portions which extend beyond the ends of said individual groups of articles, the improvement comprising:
a first shrinking unit for initially shrinking said open end portions of each said sleeve member into engagement with the articles at said ends of each said individual groups of articles to retain said articles in said sleeve member, a second shrinking unit for finally shrinking each entire sleeve member into engagement with all of the articles in its group, said first shrinking unit comprising structure defining a heat shrinking zone, means for moving said individual groups of articles continuously along a given path of movement and through said first and said second shrinking units, means for producing a moving stream of heated gas and conducting said stream into said zone, and heat shielding means in said zone and constructed and arranged to direct said stream of heated gas in said zone preferentially upon the open end portions of said tubular sleeve member, said first shrinking unit including a chamber positioned adjacent the path of movement of said individual groups of articles through said heat shrinking zone, an endless belt having a plurality of parts defining said heat shielding means, said parts being spaced apart and defining patterns of holes therethrough, conveyor means for moving said groups of articles through said heat shrinking zone, said endless belt movable in timed relationship with said individual groups of articles and said conveyor means whereby said patterns of holes are aligned with said spacings between said groups as said groups pass said chamber whereby said heated gas in said chamber is directed through said holes in said belt and substantially only onto the end portions of said tubular sleeve member to preferentially shrink said end portions.

3. An apparatus for continuously packaging a plurality of articles in a heat-shrinkable film wherein spaced individual groups of said articles are each surrounded by a tubular sleeve member having open end portions which extend beyond the ends of each said individual group of articles, said apparatus including:
a casing structure, means for supplying hot air into said casing structure, conveyor means for moving said groups of articles through said casing structure, and an endless belt including means for shielding the portion of each said tubular sleeve member extending between the ends of each said individual group of articles from direct contact with said hot air while exposing said end portions of each said sleeve member to contact with said hot air as said article groups are moved through said casing structure.

4. The apparatus of claim 3 including:
package end shrink means for shrinking the open end portions of each said sleeve member into engagement with the articles at the ends of each said individual group of articles and total package shrink means for shrinking each entire sleeve member into engagement with all of the articles in its group, said package end shrink means including said conveyor means for moving said individual groups of articles through said package end shrink means, said endless belt extending above the line of movement of said groups of articles through said package end shrink means, an elongated chamber, means for supplying hot air into said chamber, and said hot air supplied to said chamber being directed through holes in said belt to pass between said groups of articles.

5. The apparatus of claim 4 in which the lower flight of said endless belt overlies said groups of articles moving through said end shrink means and said hot air supplied to said chamber is directed downwardly through said holes in said endless belt and substantially only onto the ends of said sleeve members and downwardly between said groups of articles and through openings in said conveyor means.

6. The apparatus of claim 5 in which the bottom of said chamber is formed by said endless belt.

References Cited

UNITED STATES PATENTS

| | | | |
|---|---|---|---|
| 1,034,112 | 7/1912 | Hopkins | 34—216 X |
| 3,120,728 | 2/1964 | Snow, Jr. et al. | 53—184 X |
| 3,239,991 | 3/1966 | Copping | 53—48 X |
| 3,331,503 | 7/1967 | Brown | 53—30 X |
| 3,430,358 | 3/1969 | Denker | 34—222 |

FREDERICK L. MATTESON, JR., Primary Examiner

H. B. RAMEY, Assistant Examiner

U.S. Cl. X.R.

53—184